United States Patent
Raz et al.

[11] Patent Number: 5,913,227
[45] Date of Patent: Jun. 15, 1999

[54] AGENT-IMPLEMENTED LOCKING MECHANISM

[75] Inventors: Yoav Raz, Newton; Walter Michael Caritj, Medway; Douglas V. Johnson, Marlborough, all of Mass.

[73] Assignee: EMC Corporation, Hopkinton, Mass.

[21] Appl. No.: 08/822,680

[22] Filed: Mar. 24, 1997

[51] Int. Cl.$^6$ ................................................. G06F 12/00
[52] U.S. Cl. ........................ 711/152; 711/151; 711/211; 711/152; 711/149; 395/290; 395/860; 395/726
[58] Field of Search ........................ 711/152, 151, 711/211, 149; 395/280, 561, 726, 290, 860

[56] References Cited

U.S. PATENT DOCUMENTS

| | | | |
|---|---|---|---|
| 4,674,033 | 6/1987 | Miller | 711/151 |
| 4,876,643 | 10/1989 | McNeill et al. | 395/290 |
| 5,146,607 | 9/1992 | Sood et al. | 711/211 |
| 5,408,629 | 4/1995 | Tsuchiya et al. | 711/151 |
| 5,553,310 | 9/1996 | Taylor et al. | 395/860 |
| 5,615,373 | 3/1997 | Ho | 395/726 |
| 5,678,026 | 10/1997 | Vartti et al. | 711/152 |

FOREIGN PATENT DOCUMENTS

| | | |
|---|---|---|
| 2 188 177 | 9/1987 | United Kingdom . |
| 95/13583 | 5/1995 | WIPO . |

*Primary Examiner*—John W. Cabeca
*Assistant Examiner*—Nasser Moazzami
*Attorney, Agent, or Firm*—Fish & Richardson P.C.

[57] ABSTRACT

A method of synchronizing access to a data object that is stored within a shared storage area of a data storage system to which a plurality of host processors are connected, the method including the steps of establishing one of the plurality of host processors as a master host processor, wherein the master host processor owns the shared object within the data storage system; sending an access request from a slave host processor to the master host processor to access the shared object within the data storage system, wherein the slave host processor is one of the plurality of host processors other than the master host processor; in response to receiving the access request at the master host processor, checking whether any conflicting locks are still pending from prior access requests from any of the plurality of host processors; if no locks are still pending, granting the access request from the slave host processor; and notifying the slave processor whether its access request was granted.

21 Claims, 3 Drawing Sheets

AGENT-IMPLEMENTED LOCKING MECHANISM

BACKGROUND OF THE INVENTION

The invention relates generally to locking mechanisms for controlling access to shared data storage resources.

Today, data storage systems are commercially available that provide many gigabytes of data storage capacity and that permit multiple host processors to connect to and access that storage. The Symmetrix Model 55XX series which is sold by EMC Corporation of Hopkinton, Mass. is one example of such a system. The Symmetrix is a high performance Integrated Cache Disk Array (ICDA) that is designed for online storage. As is typical of other of the commercially available designs, the Symmetrix Model 55XX includes a large array of smaller storage (e.g. 5¼ inch) disk devices and a cache for temporarily storing data which is transferred into and out of the data storage system. In the Model 55XX there can be as many as 128 such disk devices. Each individual disk device is capable of storing from 2 to 9 GB. Thus, the total storage capacity of the system is in the hundreds of Gigabytes.

In the Symmetrix Model 55XX ICDA's one is able to define a portion of the data storage area that is shared by two or more of the host processors that are connected to the system. If the host processors that are able to access files in the shared storage area are all running UNIX operating systems, a problem can occur. Since one Unix system does not know anything about what another Unix system might be doing, it is very possible to corrupt shared files. That is, recently updated data in one file can be inadvertently overwritten by another host processor that is connected to the data storage system.

The invention described below solves this problem, not only for a group of host processors running homogeneous operating systems (e.g. UNIX based systems) but also for any group of host processors that are running heterogeneous operating systems.

SUMMARY OF THE INVENTION

In general, in one aspect, the invention is a method of synchronizing access to a data object that is stored within a shared storage area of a data storage system to which a plurality of host processors are connected. The method includes the steps of establishing one of the host processors as a master host processor, according to which it owns the shared object within the data storage system; sending an access request from a slave host processor to the master host processor to access the shared object within the data storage system; in response to receiving the access request at the master host processor, checking whether any conflicting locks are still pending from prior access requests from any of the host processors; if no locks are still pending, granting the access request from the slave host processor; and notifying the slave processor whether its access request was granted.

Preferred embodiments include the following features. The method further includes the step of denying the access request from the slave host processor if a conflicting lock is still pending. Also, the step of granting an access request involves recording in local memory that the access request was granted to the requesting processor. The object is a file system and the access request is a request to access a file in the file system.

In general, in another aspect, the invention is agent software on computer-readable medium. The agent software is for running on a master host processor which is one of a plurality of host processors connected to a data storage system and the host processors all have access to a shared storage area in the data storage system. The agent software includes means for receiving an access request from another one of the host processors, wherein the access request is a request to access an object in the data storage system; means for determining whether any conflicting locks are pending for the object stored within the shared region of the data storage system; means for granting the access request from the requesting host processor if it is determined that no conflicting locks are pending for any other host processor; and means for notifying the requesting host processor whether its access request was granted.

In preferred embodiments, the agent software also includes means for denying the access request from the requesting processor if it is determined that a conflicting lock is pending for another host processor, and the notifying means notifies the requesting host processor whether its access request was granted or denied.

In general, in still another aspect, the invention is interface software on computer-readable medium. The interface software is for running on a slave host processor which is one of a plurality of host processors connected to a data storage system, all of which have access to a shared storage area in the data storage system. The interface software includes means for preventing the slave host processor from accessing an object stored in the shared storage area when no authorization has been received from a master host processor which is another one of the host processors; means for sending an access request from the slave host processor to the master host processor, the access request being a request for accessing the object in the shared storage region; means for receiving an acknowledgment from the master host processor indicating whether the access request was granted; and means for permitting the slave processor to access the object if the received acknowledgment grants the access request.

In preferred embodiments, the interface software also includes means for notifying the master host processor when an access operation involving the object is complete.

In general, in yet another aspect, the invention is an access control method running on a host processor which is one of a plurality of host processors connected to a data storage system, all of which have access to a shared storage area in the data storage system. The method includes the steps of receiving an access request from another one of the host processors, the access request being a request to access an object stored in the shared storage area of the data storage system; determining whether any conflicting locks are pending for the object stored within the shared region of the data storage system; granting the access request from the requesting host processor if it is determined that no conflicting locks are pending for any other host processor; and notifying the requesting host processor whether its access request was granted.

In preferred embodiments, the method also includes denying the access request from the requesting processor if it is determined that a conflicting lock is pending for another host processor, and the step of notifying comprises notifying the requesting host processor whether its access request was granted or denied.

In general, in another aspect, the invention is an access control method running on a slave host processor which is one of a plurality of host processors connected to a data storage system, and all of which have access to a shared storage area in the data storage system. The method includes preventing the slave host processor from accessing an object stored in the shared storage area when no authorization has been received from a master host processor which is another one of the host processors; sending an access request from the slave host processor to the master host processor, the access request being a request for accessing the object in the shared storage region; receiving an acknowledgment from the master host processor indicating whether the access request was granted; and permitting the slave processor to access the object if the received acknowledgment grants the access request.

In preferred embodiments, the method also includes notifying the master host processor when an access operation involving the object is complete.

The invention is a mechanism for synchronizing accesses by multiple hosts to shared files on a data storage system. The mechanism, which provides an asymmetrical solution to the synchronization problem, solves the problem with database sharing at the file level. Through an agent running on one of the host processors, it provides a locking functionality without having to modify the operating system. The agent is simply an application, though in principle it could also be embedded in the operating system.

The invention also effectively and efficiently solves the inter-host access coordination problem when MVS files in shared storage areas are being directly accessed from open systems through SCSI channels. The solution is general and allows multi users to access shared files in a multi host environment (a combination of MVS based and open system hosts).

Other advantages and features will become apparent from the following description of the preferred embodiment and from the claims.

DESCRIPTION OF THE PREFERRED EMBODIMENTS

Figure 1:
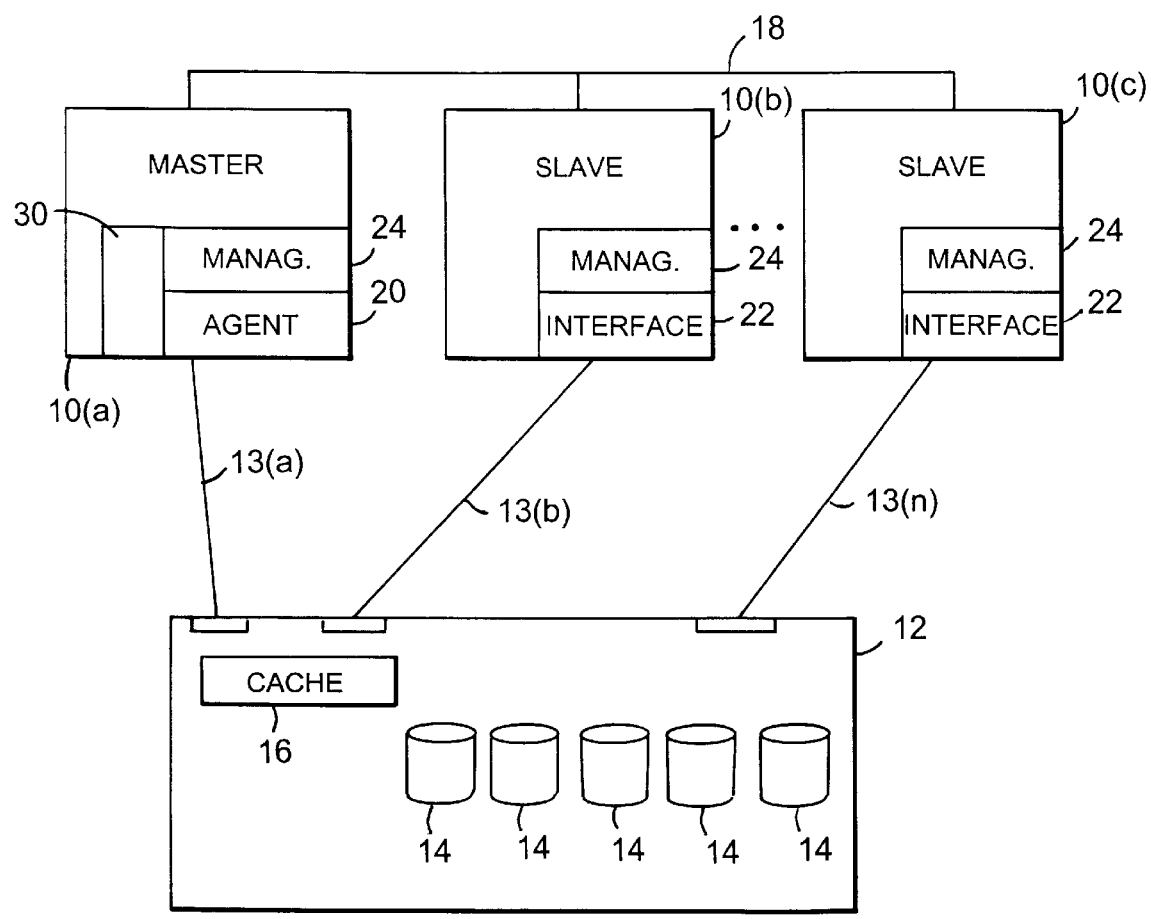
FIG. 1 is a block diagram of a system which embodies the invention.

System Overview:

In FIG. 1, there are several host processors 10(a), 10(b), . . . 10(n) (referred to generally as host processors 10) individually and separately connected to a common data storage system 12 through respective channels 13(a)–13(n). Data storage system 12 is configured to provide a shared storage region that can be accessed by all of the host computers 10 connected to the data storage system. The shared storage region can include all of the disk devices, some subset of the disk devices, or part of a single disk device. In any case, each host processor 10 is able to access the data (e.g. files) that is stored within the shared storage region. In the described embodiment, data storage system 12 is a Symmetrix Model 55XX series integrated cache disk array including an array of storage disk devices 14 and cache memory 16, though it could be any other data storage system that can be configured to provide shared storage area for multiple processors that are connected to it.

There is a channel 18 through which the host processors can communicate with each other. That channel might be implemented by a network or communication link that is separate from the data storage system as is shown, or it might be implemented by the data storage system itself.

In the described embodiment, all of the host processors have a UNIX operating system, though not all of the UNIX operating systems need be the same. Indeed, it is anticipated that each of the host processors might have a different UNIX operating system, e.g. Sun/Solaris, AIX, Digital UNIX, HP-UX, AS-400, etc.

For the following description, it is assumed that host processor 10(a) has a different operating system from the other host processors and that it has created a file system within the shared region of data storage system 12. In other words, for the file system in data storage system 12, the operating system of host processor 10(a) is the native operating system, i.e., the file system is defined in accordance with the rules of that operating system.

Because the file system is implemented within the shared storage region, the other host processors are also able to access the files in the file system. The host processor 10(a) that created the file system is considered to be the "owner" of the file system and is generally referred to as the "master" host processor. The other host processors are referred to as "slave" host processors.

The master host processor 10(a) is different from the other host processors 10(b)–10(n) in that it also has an agent software program 20 (also referred to generally as agent 20) running on it; and the other host processors have interface software programs 22 (also referred to generally as interfaces 20) running on them.

Agent 20 synchronizes access by all host processors to the files within the file system in data storage system 12. It does this by determining which host processor is authorized to have access at any given time and denying access to all other host processors. That is, it implements a locking function for accesses to the shared file system so as to prevent inadvertent corruption of the data in the file system. Agent 20 implements whatever locks are appropriate for achieving the type of access control that is desired. This might include, for example, exclusive and/or shared locks. It might also include other lock types such as those that are well known to persons skilled in the art.

The interface 22 running on the other host processors has several primary functions. One function is simply to communicate with the agent (e.g. over channel 18) and obtain the authorization that is required before accessing the file will be permitted. A second related function is to prevent access to the file until specific authorization is given for such access. A third function is to handle the communications between its host processor and the file system. If the file system is owned by a host processor that has a different operating system, then the interface is constructed to enable the requesting host processor to understand and manipulate the file structure of the other operating system. That is, in accordance with this last primary function interface 22 gives knowledge of the file system structure to the non-native operating system on the slave host processor. Note, however, that if identical operating systems are running on all of the host processors, then no mapping of services needs to be performed to enable the other host processors to know how to understand and manipulate the file system.

On each of the host processors there is also a management module 24 that provides management information which is necessary for the operation of the agent 20 and the interfaces 22. For example, the management module identifies which host processor owns the file system. That is, the management function identifies on which host processor the agent for a particular file system is located.

If different operating system are used on each of the other host processors, then the host processor that owns a particular file system is the host processor that is running the native operating system for the file system. On the other hand, if it is the case that all of the host processors are running the same operating system, then the assignment of file system ownership is completely arbitrary. That is, ownership can be assigned to any one of the host processors.

It may also be the case that there are multiple file systems, each having a different native operating system. For example, one host processor running operating system A might create a file system A and a different host processor running an operating system B might create a file system B, both file system in the shared storage region of data storage system 12. In that case, there would need to be two agents, one agent running on the host processor with operating system A and another agent running on the host processor with operating system B.

In any event, the management module is typically configured upon system set up. At that time, the relevant ownership information is stored into the local management module and the location of the agents is established. The management information can be made available from a central location to all of the hosts that are participating. When a new host processor is added to the system, it can simply look at management information to learn which processor owns what file system.

Actually, the management function can be either centralized or distributed. If it is distributed, some communication mechanisms will be needed to distribute the table identifying ownership etc. to all hosts where it is can then be stored locally. In that case, the table could be updated whenever a host makes an open file request. That is, part of the process of opening the file could also check ownership information that is stored in the central location.

Figure 2A:
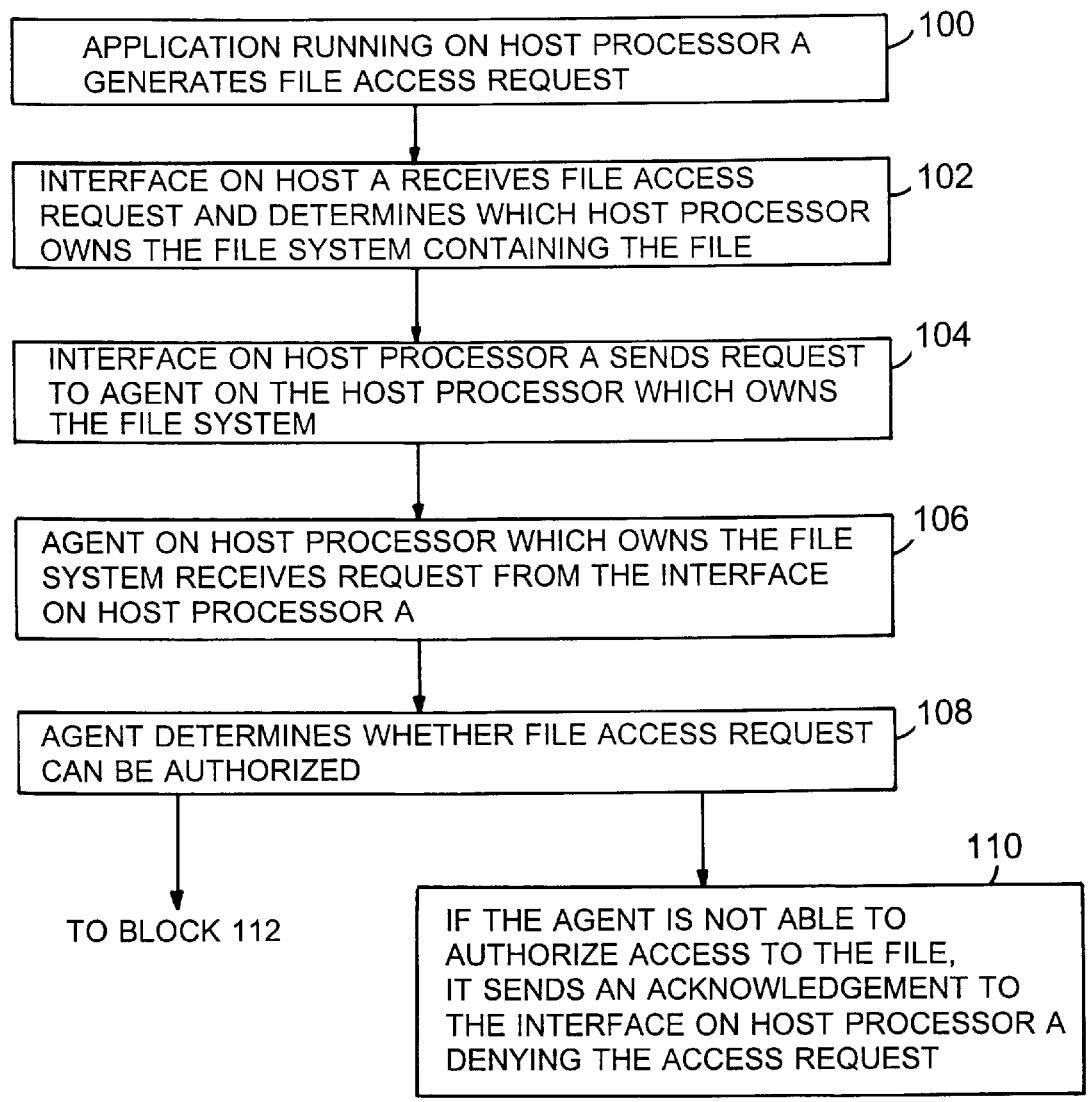
FIGS. 2A and 2B show a flow chart of the process for accessing files in shared data storage area.
Figure 2B:
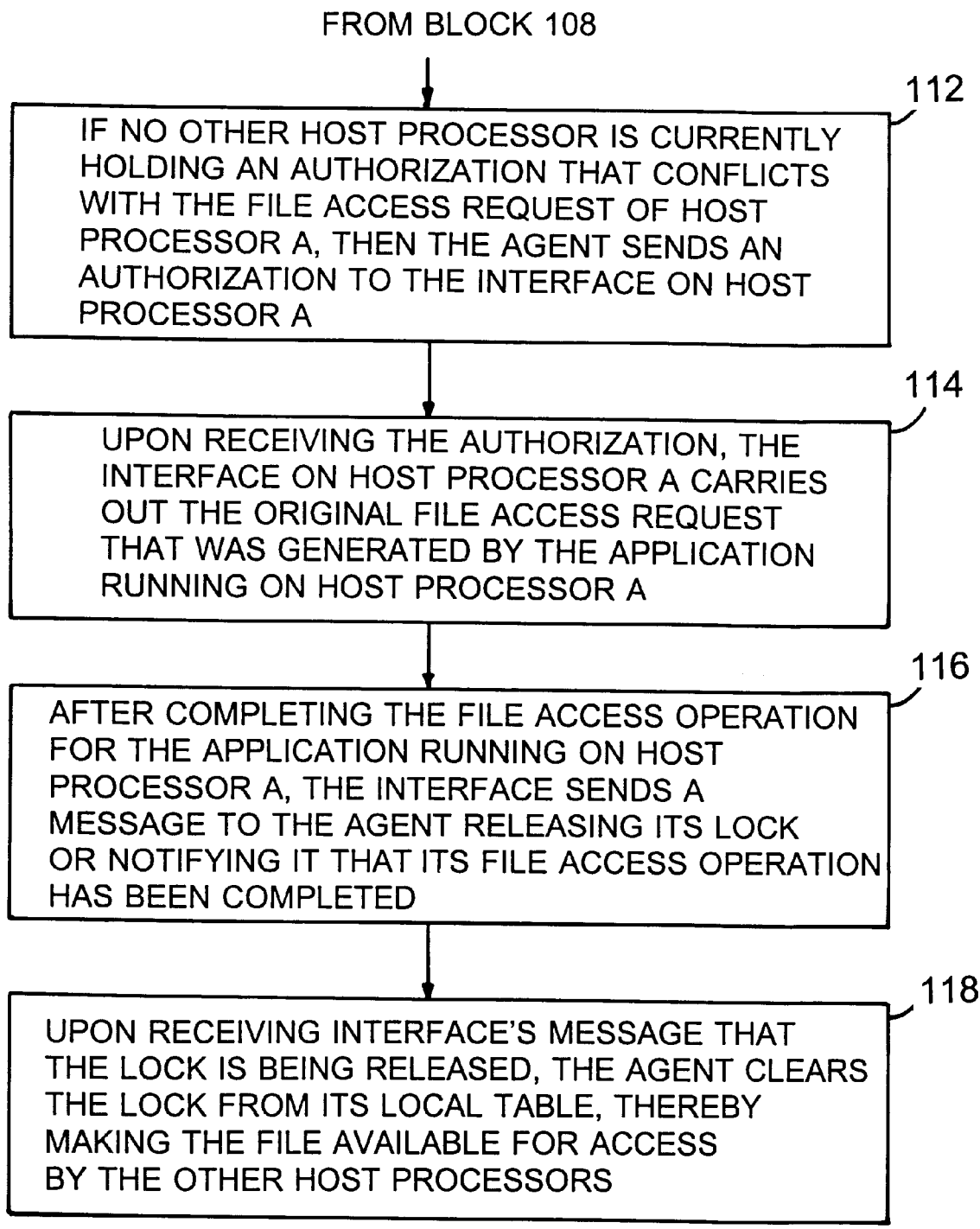

Access Synchronization Protocol:

The protocol which is implemented by the agent and the interface components operates as illustrated in FIGS. 2A and 2B.

When software running on a host processor seeks to access a file that is stored in the shared region of the data storage system, it generates a file access request (e.g. open file) which passes to the interface program on that host processor (step 100). The interface then processes the file access request by first determining, through referencing its associated management module 24, which host processor is the owner of the file to which access is being requested (step 102). After determining which host processor owns the relevant file system, the interface sends a request to open that file to the agent running on the identified host processor, i.e., the master host processor for that file system (step 104). In other words, the file access request does not go directly to the data storage system, as would normally be the case, but rather the interface processes it and redirects it to the appropriate agent to obtain authorization to access the file in the data storage system. Without authorization to do so, the interface will not permit the host processor to access the target file.

As noted above, the means by which the request is sent to the agent is not important. It could be sent over a separate channel or it could be sent via the data storage system itself, such as is described in U.S.S.N. 08/616,486, incorporated herein by reference.

The agent on the master host processor receives the request (step 106) and then determines whether any other host processors currently have a conflicting lock on the file (step 108). The agent makes this determination by referring to a locally maintained table 30 (see FIG. 1) in which the agent records the granting and the release of locks on a per file basis. It may be that a prior lock was granted to another host processor but that the present file access request is not inconsistent with the lock that is still pending. For example, if a shared lock was granted and the new file access request is only a read/no-write request, then allowing the file access will not be inconsistent with the pending lock and it will be authorized.

If no conflicting lock is still pending, then the agent is free to grant the appropriate authorization to the requesting interface. Optionally, the agent may also open up the file on behalf of the requesting host processor or, alternatively, it may simply leave that responsibility to the interface in the requesting host processor. In either case, it sends back an acknowledgment to the interface's request, authorizing access to the file (step 112) and it records the granting of that authorization in its local table.

When the interface at the requesting host processor receives the acknowledgment indicating that a file access authorization (e.g. lock) has been given to it for accessing the file, it then carries out the operation that was originally requested by the application running on the host processor (step 114).

Upon completing the file operation, the interface on the host processor sends a notification to the agent releasing the lock (step 116). The agent then clears its table of the lock so that other host processors can be granted authorization to access the file (step 118).

In step 108, if the agent is unable to authorize the requested file access operation because a conflicting lock has already been granted and is still pending, it sends a message to the interface denying its request (step 110). In that case, the interface notifies the application that generated the file access request and waits for a new request to be generated at a later time.

Note that the request that the interface sends to the agent and the returned acknowledgment might typically include a set of parameters which are used to specify the particular file access operation that is being requested and they type of lock that was requested and the type of lock that was granted.

In the above description, it had been assumed that the operating systems were all open systems type operating systems (i.e., UNIX). However, that need not be the case. Indeed, the Symmetrix Model 55XX series ICDA's allow both mainframe and open systems devices to connect to the storage system at the same time and to access a shared storage region within the storage system. Thus, at least one of the host processors might be running an MVS operating system and the others might be running open systems operating systems. In the case of an MVS file system in the data storage system, there would need to be an MVS based agent on the mainframe host processor. That agent would acquire and release locks on behalf of the open system host processors that want to access any MVS files in the data storage system. That is, prior to accessing an MVS file by the open system in a certain locking mode (e.g., DISP= SHR), the agent attempts to open the file in the same mode. The open system would access the MVS file in the requested mode if and only if the agent succeeded to open the file in this mode. After processing of the file is complete, the lock is released by the agent closing the file. In this way the open system users accessing an MVS file acquires the MVS lock by being an MVS user (via the agent).

As indicated previously, the interfaces on the open system side handle the job of communicating with the agent and getting authorization to access file. The interface also must be designed to understand the MVS file system, i.e., it must be programmed to know the rules and protocol for the MVS file system.

Though the agent/interface mechanism was described in connection with a shared file system, it could be implemented in connection with any application or object level sharing, e.g. storage level, file level, or database level.

Also, it should be understood that the functionality of the agent can be extended beyond that described above. For example, if the agent is running on an MVS system, it could acquire MVS Catalog information about a requested file for the open systems (e.g., the VOLUME on which the file is located) in order to simplify the access to the file from the open systems.

In addition, if the same functionality is applied to database files, the MVS agent would run as an application on the respective (MVS based) database system. The locks utilized could then be those available in the database system. If no explicit locking is available, implicit locking would need to be invoked by the agent invoking appropriate database access operations (e.g. the minimum necessary for achieving the desired locking). For coarse granularity locking intended for relatively long database accesses, such a mechanism can be reasonable. For fine granularity and short accesses, however, this mechanism could generate contention.

It should be noted that the agent/interface mechanism will work best in environments in which explicit locks are available, i.e., the locks are decoupled from the I/O (input/output).

The agent and interface software resides on computer readable medium which is accessible by the host processor on which that software is running. The computer readable medium could be RAM, ROM, disk drives, or any other form of electronic storage that is used for software programs.

Other embodiments of the invention are within the following claims.

What is claimed is:

1. A method of synchronizing access to an identified data object that is stored within a shared storage area of a data storage system to which a plurality of processors are connected, each of said plurality of processors being connected to said data storage system through a corresponding different channel, said method comprising:

establishing one of said plurality of processors as a master processor, wherein said master processor owns the identified shared object within the data storage system;

sending an access request from a slave processor to the master processor to access the identified shared object within the data storage system, said slave processor being one of said plurality of processors other than the master processor;

in response to receiving the access request at the master processor, checking whether any conflicting locks are still pending from prior access requests from any of the plurality of processors;

if no locks are still pending, granting the access request from the slave processor; and notifying the slave processor whether its access request was granted.

2. The method of claim 1 further comprising the step of denying the access request from the slave processor if a conflicting lock is still pending and wherein notifying step includes notifying the slave processor whether its access request was granted or denied.

3. The method of claim 2 wherein the step of granting an access request comprises recording in local memory that the access request was granted to the requesting processor.

4. The method of claim 3 wherein the object is a file system.

5. The method of claim 4 wherein the access request is a request to access a file in the file system.

6. Agent software on computer-readable medium, said agent software for running on a master host processor which is one of a plurality of processors connected to a data storage system, said plurality of processors all having access to a shared storage area in the data storage system and each being connected to said data storage system through a corresponding different channel, said agent software comprising:

means for receiving an access request from another one of said plurality of processors, said access request being a request to access an identified object in the shared storage area of the data storage system;

means for determining whether any conflicting locks are pending for the identified object stored within the shared storage area of the data storage system;

means for granting the access request from the requesting processor if it is determined that no conflicting locks are pending for any other processor; and means for notifying the requesting processor whether its access request was granted.

7. The agent software of claim 6 further comprising means for denying the access request from the requesting processor if it is determined that a conflicting lock is pending for another processor, and wherein the notifying means notifies the requesting processor whether its access request was granted or denied.

8. The agent software of claim 7 wherein the object is a file system.

9. The agent software of claim 8 wherein the access request is a request to access a file in the file system.

10. Interface software on computer-readable medium, said interface software for running on a slave processor which is one of a plurality of processors connected to a data storage system, said plurality of host processors all having access to a shared storage area in the data storage system and each being connected to said data storage system through a corresponding different channel, said interface software comprising:

means for preventing said slave processor from accessing an identified object stored in the shared storage area when no authorization has been received from a master processor which is another one of said plurality of processors;

means for sending an access request from the slave processor to the master processor, said access request being a request for accessing said identified object in the shared storage area;

means for receiving an acknowledgment from the master processor indicating whether the access request was granted; and means for permitting the slave processor to access the object if the received acknowledgment grants the access request.

11. The interface software of claim 10 further comprising means for notifying the master processor when an access operation involving the object is complete.

12. The interface software of claim 11 wherein the object is a file system.

13. The interface software of claim 12 wherein the access request is a request to access a file in the file system.

14. An access control method running on a processor which is one of a plurality of processors connected to a data storage system, said plurality of processors all having access to a shared storage area in the data storage system and each being connected to said data storage system through a corresponding different channel, said access control method comprising:

receiving an access request from another one of said plurality of processors, said access request being a request to access an identified object stored in the shared storage area of the data storage system;

determining whether any conflicting locks are pending for the identified object stored within the shared storage area of the data storage system;

granting the access request from the requesting processor if it is determined that no conflicting locks are pending for any other processor; and notifying the requesting host processor whether its access request was granted.

15. The method of claim 14 further comprising denying the access request from the requesting processor if it is determined that a conflicting lock is pending for another processor, and wherein the step of notifying comprises notifying the requesting processor whether its access request was granted or denied.

16. The method of claim 15 wherein the object is a file system.

17. The method of claim 16 wherein the access request is a request to access a file in the file system.

18. An access control method running on a slave processor which is one of a plurality of processors connected to a data storage system, said plurality of processors all having access to a shared storage area in the data storage system and each being connected to said data storage system through a corresponding different channel, said method comprising:

preventing said slave processor from accessing an identified object stored in the shared storage area when no authorization has been received from a master processor which is another one of said plurality of processors;

sending an access request from the slave processor to the master processor, said access request being a request for accessing said identified object in the shared storage area;

receiving an acknowledgment from the master processor indicating whether the access request was granted; and permitting the slave processor to access the object if the received acknowledgment grants the access request.

19. The method of claim 18 further comprising notifying the master processor when an access operation involving the object is complete.

20. The method of claim 19 wherein the object is a file system.

21. The method of claim 20 wherein the access request is a request to access a file in the file system.

* * * * *